Aug. 12, 1958 S. METZGER 2,847,566

DEMODULATION SYSTEM

Filed Jan. 10, 1955 3 Sheets-Sheet 1

INVENTOR.
SIDNEY METZGER
BY Charles H. Brown
ATTORNEY

Aug. 12, 1958 S. METZGER 2,847,566

DEMODULATION SYSTEM

Filed Jan. 10, 1955 3 Sheets-Sheet 2

INVENTOR.
SIDNEY METZGER
BY
Charles H. Brown
ATTORNEY

INVENTOR.
SIDNEY METZGER
BY
Charles H. Brown
ATTORNEY 2,847,566
Patented Aug. 12, 1958

1

2,847,566

DEMODULATION SYSTEM

Sidney Metzger, Trenton, N. J., assignor, by mesne assignments, to the United States of America as represented by the Secretary of the Navy Application January 10, 1955, Serial No. 480,785

6 Claims. (Cl. 250—27)

This invention relates to a method of and means for demodulating a frequency modulated carrier which is modulated by a frequency shift or an on-off type of signal, such as teletype, data transmission, or signals as used in an on-off type of frequency sensitive control system.

Typical discriminator circuits include tuned circuits which require careful adjustment. The tuned circuit type of discriminator is subject to a change of resonant frequency with temperature, thus producing direct current bias errors. Such tuned discriminators also require a reshaper to alter the waveform of the output signal, as an additional circuit.

An object of the invention is to obtain demodulation of a frequency modulated carrier wave in a manner which eliminates the use of tuned circuits, and which is stable in operation.

Another object of the invention is to obtain demodulation of a frequency modulated carrier wave by means of a discriminator system which does not require tuned circuits and accomplishes the reshaping of the signal waveform as a part of the discriminator action.

A still further object of the invention is to demodulate a frequency modulated carrier modulated by an on-off or frequency shift type of signal in a discriminator system which does not include tuned circuits, and achieves the reshaping of the waveform of the output signal as a part of the discriminator action.

The above objects of the invention are accomplished by a circuit which includes a limiter to which an incoming signal is fed from the preceding radio frequency and intermediate frequency stages of a receiver. The output signal from the limiter is fed to a differentiator from which the output signal is applied to a bistable multivibrator over two paths, one path reaching the multivibrator directly and the other via a delay circuit. This multivibrator is of the type sometimes referred to as a locking circuit, characterized by remaining in a particular condition or state of stability or equilibrium until triggered by a pulse to its other stable condition. The differentiated signal in one path triggers the multivibrator in one direction while the differentiated signal in the other path restores or returns the multivibrator to its original state. The operation of the system which includes the limiter, differentiator, bistable multivibrator and delay circuit is such as to demodulate the incoming signal. The output signal from the bistable multivibrator is applied to a low pass filter in order to recover at the output of the system a copy of the original signal appearing at the input to the system.

A more detailed description of the invention follows with reference to the accompanying drawing, wherein.

Figure 1:
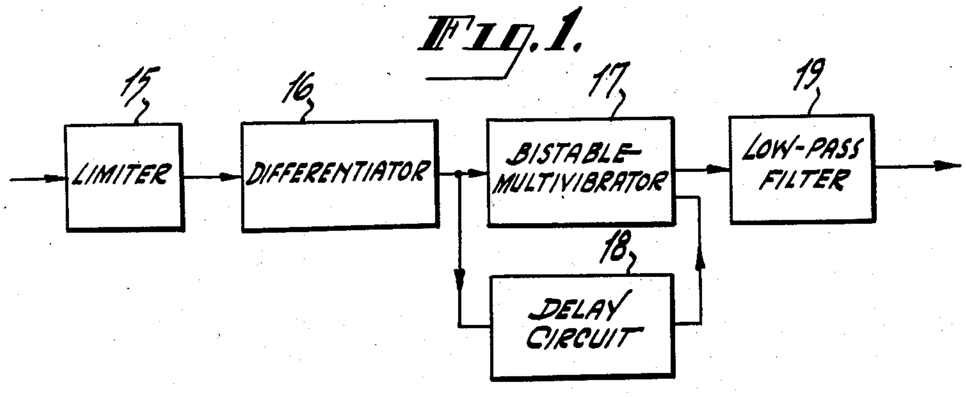
Fig. 1 is a block diagram of a frequency demodulation system constructed in accordance with the teachings of the invention.

Referring to Fig. 1, an incoming signal, after undergoing the usual radio frequency and intermediate frequency amplification at preceding stages of a receiver, not shown, is fed into an amplitude limiter 15. The limited output from apparatus 15 is fed to a differentiator circuit 16 which produces a narrow positive pulse for each positive going edge of the limiting wave and a narrow negative pulse for each negative going edge of the limiting wave. The signal output of the differentiator circuit 16 is applied to a bistable multivibrator 17 directly and also to a delay circuit 18. The signal present at the output of the delay circuit 18 is also fed to the bistable multivibrator 17. The output of the bistable multivibrator 17 is applied to a low pass filter 19 which removes the pulses and slots present in the wave shape of the output signal from the bistable multivibrator 17. The output signal is fed from the low pass filter 19 to subsequent stages of the receiver, not shown.

Figures 2, 4:
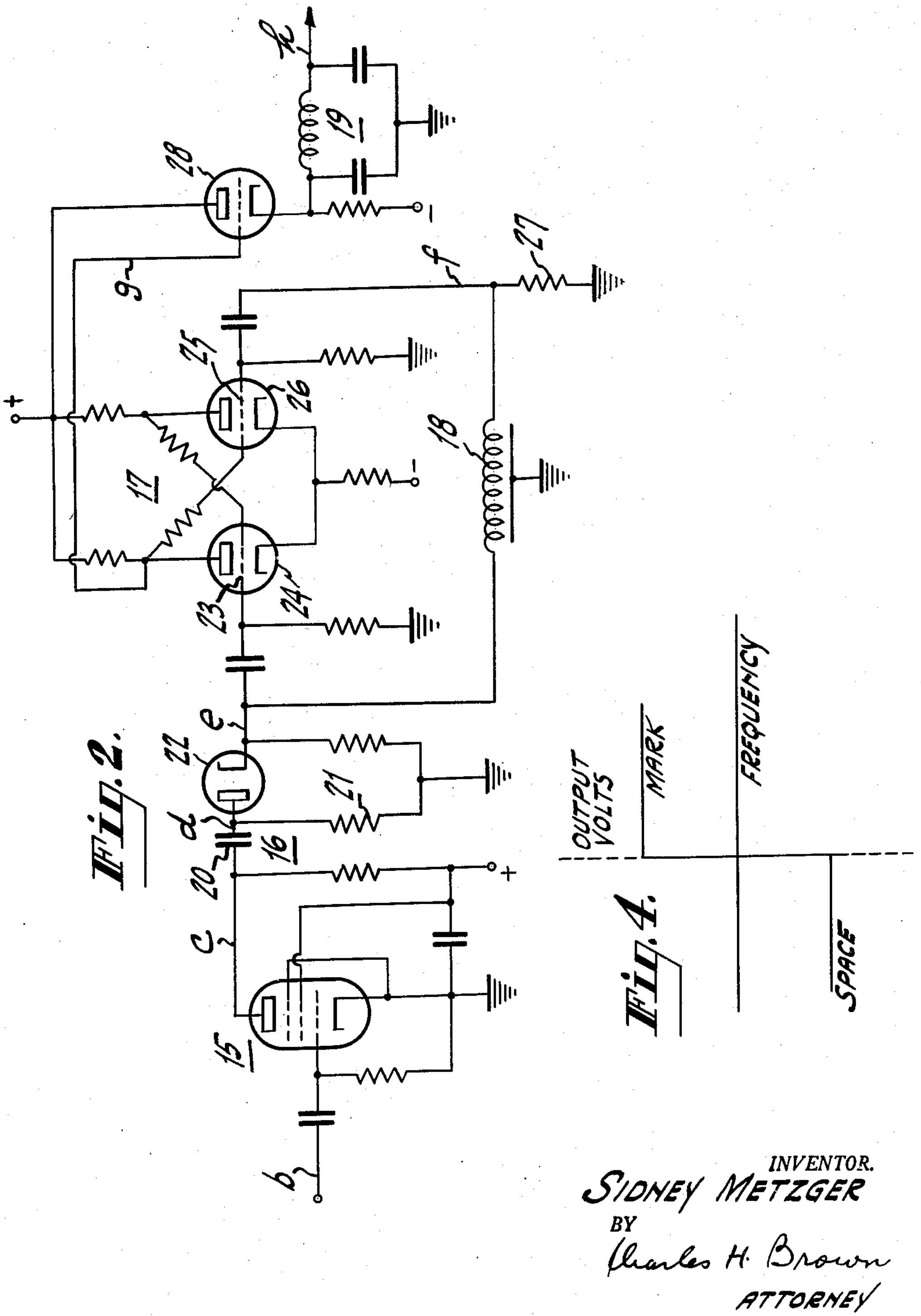
Fig. 2 is a circuit diagram of one form which the embodiment set forth in Fig. 1 may take.
Fig. 4 is a graphic presentation of the frequency characteristic of a demodulation system constructed according to the invention.
Figure 3:
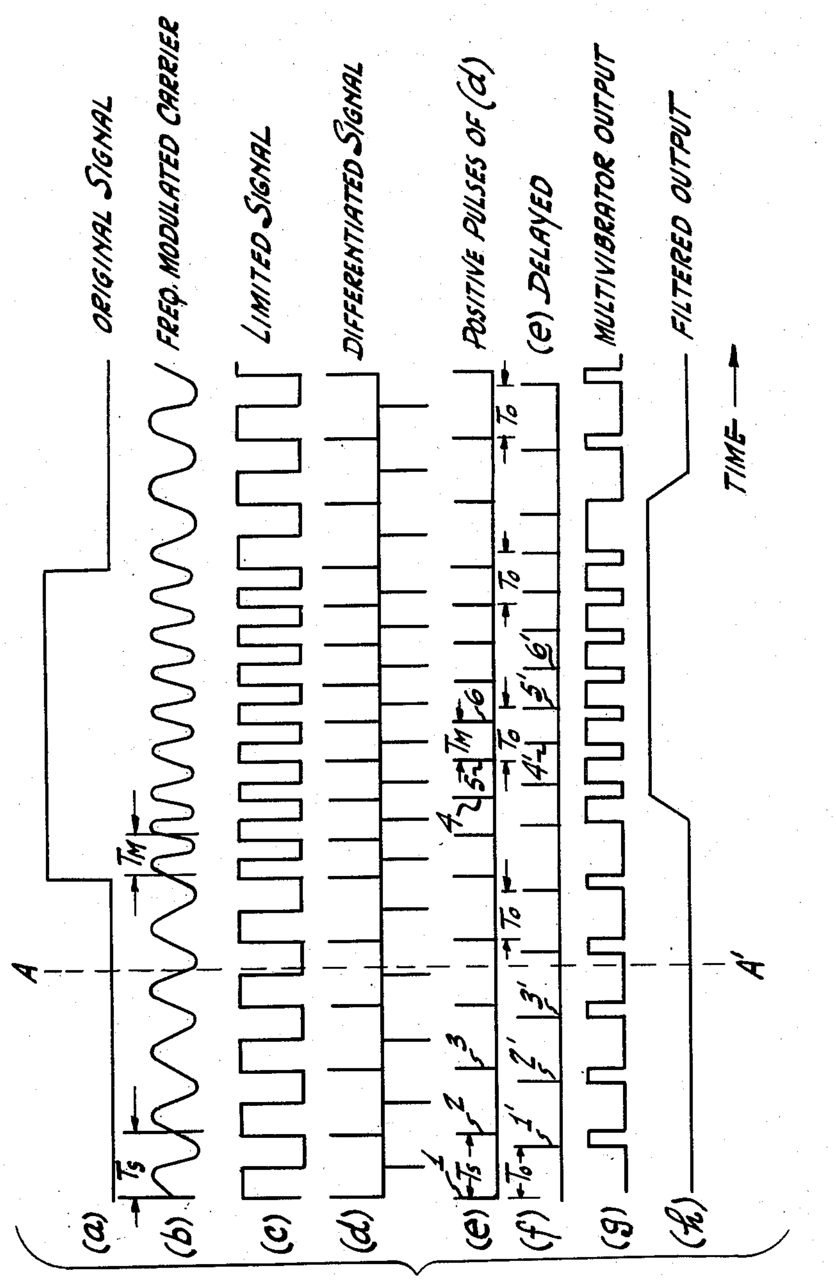
Fig. 3 shows a series of curves illustrating voltage variations and waveforms occurring at various designated points in the circuit of Fig. 2. These wave shapes are drawn to a common time scale so that the wave shapes appearing at the various portions of the circuit, at a given instant, lie along a vertical line, for example A—A′.

A more complete understanding of the invention may be obtained from an examination of Fig. 2 which is a circuit diagram of one form which the invention may take. Reference will also be made to Fig. 3 which shows a series of curves (*a* through *h*) illustrating voltage variations and waveforms occurring at various designated points in the circuit of Fig. 2.

The original signal curve (*a*) at the transmitter modulates the frequency of a carrier as in curve (*b*). At the receiver, after undergoing the usual radio frequency and intermediate frequency amplification, the frequency modulated signal of wave shape curve (*b*) is fed into the amplitude limiter 15. The limited output (*c*) is then fed to a differentiator circuit 16 which includes a series condenser 20 and a shunt resistor 21 chosen so that the time constant RC is very small compared to the period of the incoming wave. The differentiator 16 will produce a narrow positive pulse for each positive going edge of the limited wave and a narrow negative pulse for each negative going edge. The output signal from the differentiator is shown in Fig. 3 as wave shape curve (*d*). Since only one polarity of pulses is required for operation of the circuit, a rectifier, which is shown as an electron discharge device 22, assures that only positive pulses curve (*e*) are passed on due to the low forward impedance of the rectifier to positive signals, while the high impedance of the rectifier to negative signals attenuates the negative pulses.

The output signal curve (*e*) from the cathode of the rectifier 22 is fed to the grid 23 of evacuated electron discharge device 24 directly through a condenser. The output signal curve (*e*) from the cathode of the rectifier 22 is also fed via a delay circuit 18 to the grid 25 of an evacuated electron discharge device 26. The delay circuit 18 shown in Fig. 2 is a delay line of delay $T_0$ seconds, terminated in its characteristic impedance by resistor 27 to avoid reflections. It is to be understood that other delay circuits such as phantastron or a delay multivibrator may be used. In these circuits a pulse into the input will, after a definite desired delay, produce a pulse from the output.

Electron discharge devices 24 and 26 constitute a form of bistable multivibrator 17 so connected that a positive pulse fed to the grid 23 of discharge device 24 will cause it to conduct (assuming it was originally cut off) and will cut off the flow of current through discharge device 26. Additional positive pulses fed to the grid 23 of discharge device 24 while it is conducting will have no further effect. However, a positive pulse later fed to the grid 25 of discharge device 26 will cause it to conduct and automatically cut off the flow of current through discharge device 24. As in the case of discharge device 24, additional positive pulses fed to the grid 25 of discharge device 26 while it is conducting will have no effect, but the next positive pulse fed to grid 23 of discharge device 24 will cause it to conduct and cut off the flow of current through discharge device 26.

Assuming, for example, that a space condition of the original signal curve (*a*) corresponds to a frequency of 1,000 cycles of the wave in curve (*b*), this corresponds to a period $T_s$ of 1,000 microseconds, as shown in the wave shape (*b*) in Fig. 3. Similarly, a mark condition of the original signal (*a*) may correspond to a frequency of 1,170 cycles of the wave (*b*) which corresponds to a period $T_m$ of 855 microseconds, as shown in the wave shape (*b*) in Fig. 3. For proper operation of the system, it is necessary that the delay $T_o$, provided by the delay circuit 18, lie between the values 855 microseconds and 1,000 microseconds. It can be anywhere between these values, but a delay half way between these limits, 927.5 microseconds, will permit a drift of the delay circuit of $\pm 72.5$ microseconds (or about $\pm$ eight percent). A delay of 900 microseconds, for example, would permit a tolerance of $+100$ microseconds and $-45$ microseconds. In the remainder of this description, the delay $T_o$ will be assumed to be the value of 927.5 microseconds lying between the time limits of the mark and space differentiated positive pulses applied to the multivibrator.

In the operation of the bistable multivibrator, referring to Figs. 2 and 3, pulse 1, wave shape curve (*e*) of Fig. 3, at the grid 23 of discharge device 24 will cause discharge device 24 to conduct thereby lowering its plate voltage, as shown in the wave shape (*g*) of Fig. 3. Simultaneously, conduction of discharge device 24 will cut off the flow of current through discharge device 26 because of the regenerative action of the multivibrator. Meanwhile, positive pulse 1 appears at grid 25 of discharge device 26 $T_o$ seconds later, as shown in wave shape curve (*f*) in Fig. 3, the delayed pulse fed to discharge device 26 being identified by the numeral 1'. Pulse 1' causes discharge device 26 to conduct thereby cutting off discharge device 24 and raising its plate potential, as shown in wave shape curve (*g*) in Fig. 3. The next action that takes place occurs when positive pulse 2, shown in wave shape curve (*e*) in Fig. 3, arrives at the grid 23 of discharge device 24 and causes discharge device 24 to conduct, lowering its plate potential, as shown in wave shape (*g*) in Fig. 3, and cutting off the flow of current through discharge device 26. At a time $T_o$ seconds later, this same pulse 2 appears at grid 25 of discharge device 26 as pulse 2', shown in wave shape curve (*f*) in Fig. 3. Pulse 2' causes discharge device 26 to conduct and cuts off discharge device 24, thereby, raising its plate potential, as shown in wave shape curve (*g*) in Fig. 3. This process continues, producing the wave shape curve (*g*) in Fig. 3 at the plate of discharge device 24. The wave shape (*g*), as shown in Fig. 3, for a space condition of the original signal for the numerical values used in the description, will include pulses of duration $T_s$ minus $T_o$ seconds or 72.5 microseconds, whose leading edges are spaced $T_s$ seconds or 1,000 microseconds apart.

Under mark condition, the operation of the demodulation system including multivibrator 17 is the some as was just described for space condition, except that $T_o$ is greater than $T_m$, where $T_m$ represents the time period of mark condition. As pointed out above, for a space condition, $T_o$ is less than $T_s$. In other words, for both mark and space condition of the incoming signal, the time delay $T_o$ will remain constant even though the period of mark condittion $T_m$ is less than the space condition $T_s$ is greater than the delay time $T_o$.

Referring to Fig. 3, wave shapes of curves (*e*), (*f*) and (*g*), it may be seen that, during the mark condition, a pulse 5 applied to the grid 23 of discharge device 24 causes discharge device 24 to conduct. At a time $T_o$ minus $T_m$ seconds later pulse 4', which is pulse 4 delayed, causes discharge device 26 to conduct, thereby, cutting off discharge device 24. Similarly, pulse 6 causes discharge device 24 to conduct, thereby lowering its plate potential. Pulse 5', which is pulse 5 delayed $T_o$ seconds, thereafter, causes discharge device 26 to conduct, thereby, cutting off discharge device 24. It is apparent that the basic operation of the circuit lies in the fact that the delay $T_o$ is less than the period $T_s$ corresponding to the space period, and greater than the period $T_m$, corresponding to the mark period. This difference causes the delayed pulse, pulse 2' for example, to initiate the operation of the multivibrator prior to the arrival of the next direct pulse 3. During the mark condition, on the other hand, the delayed pulse 4', which is pulse 4 delayed $T_o$ seconds, arrives after the next direct pulse 5. The output signal from the bistable multivibrator 17 will appear as shown in wave shape (*g*) of Fig. 3.

Figure 5:
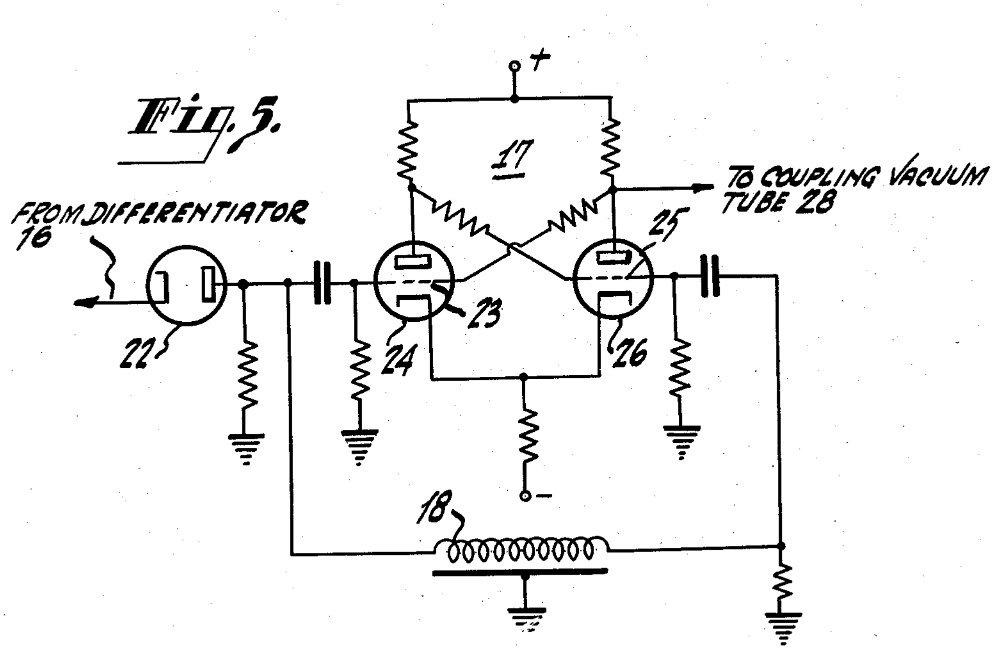
Fig. 5 is a circuit diagram of an arrangement of the embodiment shown in Fig. 2, which utilizes positive pulses, wherein negative pulses may be utilized.

While the description of the invention has assumed the use of positive pulses only in the inputs to the multivibrator 17, the system can also be arranged to use negative pulses only. Referring to Fig. 5, it is only necessay to reverse the leads to the cathode and plate of rectifier 22. Because the operation of the multivibrator is now reversed, an inverted signal would be obtained from the plate of discharge device 24. Therefore, the output from the multivibrator must be taken from the plate of discharge device 26, as shown in Fig. 5.

In order to recover a copy of the original signal (*a*) from the wave shape appearing at the plate of discharge device 24, a low pass filter 19 is used to remove the pulses and slots in the wave shape. For example, a teletype code for 100 words per minute corresponds to bauds of duration 13,200 microseconds (or multiples of this), so that the low pass filter passing these bauds will substantially reject the effect of the slots during the mark condition and pulses during the space condition, these slots and pulses having a duration of 72.5 microseconds in the numerical example used herein. The filter 19 is connected to the plate of discharge device 24 by means of a coupling vacuum tube 28. Coupling tube 28 performs two functions which are not fundamental to the operation of the demodulation system as such, but which might be needed in some applications of the system. First, coupling tube 28 acts as a buffer between the filter 19 and multivibrator 17, thereby permitting the multivibrator output to have faster regenerative action than if the filter were directly in its plate circuit. Second, by proper choice of the negative potential to which the cathode of the coupling tube 28 is returned, the circuit voltages can be arranged to have, the space output of coupling tube 28 at ground potential and the mark at some value $+E$. It would also be possible, for example, to have space correspond to $$-\frac{E}{2} \text{ volts}$$

(with respect to ground) and mark to $$+\frac{E}{2}$$

The voltage output versus frequency characteristic of the system is shown in Fig. 4. Whereas typical discriminators have an "S" characteristic, the discriminator circuit of the invention has a step wave which is very desirable for certain applications, for example, where full level voltage output is desired for only relatively small changes in frequency (from the reference frequency). Also, in circuits utilizing discriminators having an "S" characteristic, any shift in frequency brings about a corresponding change in voltage output which is most undesirable in many types of equipment where output stability is necessary. It may be readily seen from an examination of Fig. 4 that any drift in frequency of the signal fed through the demodulating system will have little or no effect on the voltage output therefrom. The voltage output will remain essentially constant even though shifts in frequency have occurred which would in the typical discriminator circuit bring about a corresponding change in the output voltage.

From an examination of wave shapes (*e*), (*f*) and (*g*) in Fig. 3, it will also be seen that the multivibrator action of discharge devices 24 and 26 performs a shaping operation on the incoming signal, providing an output wave shape (*g*) of uniform amplitude. It is not necessary to provide additional stages to perform this reshaping of the output signal.

Having described my invention, I claim:

1. A demodulation system for demodulating a signal frequency modulated by a frequency shift on-off type of signal, said modulated signal shifting in frequency between a first and second frequency, comprising, in combination, an input circuit to which said modulated signal is applied, means connected to said input circuit to convert said modulated signal into a train of narrow pulses of uniform amplitude, said train of narrow pulses having repetition rates corresponding to the first and second frequencies of said modulated signal, a bistable multivibrator including a first and second current conducting device, pulse selecting means connected to said converting means to pass only the pulses of a given polarity, a delay line arranged to provide a delay of a constant amount greater than the interval of time between adjacent ones of said pulses of given polarity corresponding to said modulated signal when of said first frequency and smaller than the interval of time between adjacent ones of said pulses of given polarity corresponding to said modulated signal when of said second frequency, means for feeding said pulses of given polarity to said first device and to said delay line, said first device being responsive to each of said pulses of given polarity to cause said multivibrator to assume a given one of the stable states thereof, means for feeding the pulses of given polarity each delayed by said constant amount from said delay line to said second device, said second device being responsive to each of said delayed pulses of given polarity to cause said multivibrator to assume the other stable state thereof, and an output circuit connected to one of said devices and including means for integrating the output of said multivibrator.

2. A demodulation system for demodulating a signal frequency modulated by a frequency shift on-off type of signal, said modulated signal shifting in frequency between a first and second frequency, comprising, in combination, a limiter to which said modulated signal is applied, said limiter operating to cause said modulated signal to be of a uniform amplitude, a differentiating circuit connected to the output of said limiter for converting said modulated signal into a train of narrow pulses of uniform amplitude, said train of pulses having repetition rates corresponding to the first and second frequencies of said modulated signal, a bistable multivibrator including a first and second current conducting device, pulse selecting means connected to said differentiating circuit to pass only the pulses of a given polarity, a delay line arranged to provide a delay of a constant amount greater than the interval of time between adjacent ones of said pulses of given polarity corresponding to said modulated signal when of said first frequency and smaller than the interval of time between adjacent ones of said pulses of given polarity corresponding to said modulated signal when of said second frequency, means for feeding said pulses of given polarity to said first device and to said delay line, said first device being responsive to each pulse of given polarity to cause said multivibrator to assume a given one of the stable states thereof, means for feeding the pulses of given polarity each delayed by said constant amount from said delay line to said second device, said second device being responsive to each delayed pulse of given polarity to cause said multivibrator to assume the other stable state thereof, and an output circuit connected to one of said devices and including means for integrating the output of said multivibrator.

3. A demodulation system as claimed in claim 2 and wherein said pulse selecting means includes a unidirectional current conducting device poled such that said pulses of given polarity are only of a positive polarity.

4. A demodulation system as claimed in claim 2 and wherein said pulse selecting means includes a unidirectional current conducting device poled such that said pulses of given polarity are only of a negative polarity.

5. A demodulation system as claimed in claim 2 and wherein said first frequency is higher than said second frequency, said delay line being arranged to provide a delay of a constant amount mid-way between the interval of time between adjacent ones of said pulses of given polarity corresponding to said modulated signal when of said first frequency and the interval of time between adjacent ones of said pulses of given polarity corresponding to said modulated signal when of said second frequency.

6. A demodulation system as claimed in claim 2 and wherein said output circuit includes a low-pass filter connected to said one device through a coupling vacuum tube, and means for biasing said tube to control in a desired manner the on-off levels of the output signal produced by said multivibrator and fed through said filter for application to a utilization circuit.

References Cited in the file of this patent

UNITED STATES PATENTS

| | | |
|---|---|---|
| 2,212,967 | White | Apr. 16, 1938 |
| 2,456,026 | Shenk | Dec. 14, 1948 |
| 2,531,446 | Levy | Nov. 28, 1950 |
| 2,549,071 | Dusek | Apr. 17, 1951 |
| 2,553,284 | Sunstein | May 15, 1951 |
| 2,644,133 | Soukaras | June 30, 1953 |
| 2,713,677 | Scott | July 19, 1955 |
| 2,720,584 | Sloughter | Oct. 11, 1955 |